US009161550B2

(12) United States Patent
Basso et al.

(10) Patent No.: US 9,161,550 B2
(45) Date of Patent: Oct. 20, 2015

(54) CARCASS STABILIZER (71) Applicant: JARVIS PRODUCTS CORPORATION, Middletown, CT (US)

(72) Inventors: Harry W. Basso, Haddam Neck, CT (US); Edward R. Wallace, Middletown, CT (US)

(73) Assignee: Jarvis Products Corporation, Middleton, CT (US)

( * ) Notice: Subject to any disclaimer, the term of this patent is extended or adjusted under 35 U.S.C. 154(b) by 0 days.

(21) Appl. No.: 14/412,005

(22) PCT Filed: Sep. 3, 2013

(86) PCT No.: PCT/US2013/057798
§ 371 (c)(1),
(2) Date: Dec. 30, 2014

(87) PCT Pub. No.: WO2014/036547
PCT Pub. Date: Mar. 6, 2014

(65) Prior Publication Data
US 2015/0164095 A1    Jun. 18, 2015

Related U.S. Application Data (60) Provisional application No. 61/695,505, filed on Aug. 31, 2012.

(51) Int. Cl.
A22C 18/00 (2006.01)
A22C 17/02 (2006.01)
A22B 7/00 (2006.01)

(52) U.S. Cl.
CPC ............... *A22C 17/02* (2013.01); *A22B 7/003* (2013.01)

(58) Field of Classification Search
USPC ......... 452/149, 152, 153, 177–180, 185, 187, 452/189, 197
See application file for complete search history.

(56) References Cited

U.S. PATENT DOCUMENTS

| | | | |
|---|---|---|---|
| 3,095,602 A | 7/1963 | Kottner | |
| 4,653,150 A | 3/1987 | Leining | |
| 4,797,975 A | 1/1989 | Soullard | |
| 5,160,295 A * | 11/1992 | Bekkers | 452/160 |
| 5,279,518 A * | 1/1994 | Ekiss et al. | 452/128 |
| 6,027,405 A | 2/2000 | Leining et al. | |
| 6,126,536 A | 10/2000 | Kielwasser | |
| 6,174,229 B1 * | 1/2001 | Nielsen et al. | 452/106 |
| 6,244,951 B1 * | 6/2001 | Leining | 452/185 |
| 2008/0081548 A1 | 4/2008 | Muldrew et al. | |
| 2012/0040597 A1 | 2/2012 | Fern et al. | |

FOREIGN PATENT DOCUMENTS

EP    1417889 A2    5/2004

* cited by examiner

*Primary Examiner* — Richard Price, Jr.
(74) *Attorney, Agent, or Firm* — DeLio, Peterson & Curcio LLC; Peter W. Peterson (57) ABSTRACT

A carcass stabilizer for holding a carcass and preventing swinging motion parallel to a carcass rail has a pair of arms that open widely to grasp a swinging carcass as the carcass moves at a point below the suspension point of the carcass. The arms continuously move with the carcass as a carcass processing operation is performed and also preferably move down during the processing operation to exert a downward pull on the carcass and thereby straighten the centerline of the carcass and more accurately hold it in an aligned position.

23 Claims, 12 Drawing Sheets

CARCASS STABILIZER

PRIORITY

This application claims priority to PCT Application No. PCT/US2013/057798 filed Sep. 3, 2013, which claims priority of U.S. Provisional Application Ser. No. 61/695,505 filed on Aug. 31, 2012, which are hereby incorporated by reference in its entirety.

BACKGROUND OF THE INVENTION

1. Technical Field

The present invention relates to automated carcass processing equipment. More particularly, the invention relates to apparatus and methods for stabilizing a moving carcass to present it at an accurately known moving position along a carcass rail relative to automated or robotic carcass processing equipment. By reliably stabilizing the location of each moving carcass, automated carcass processing equipment, such as carcass splitters and the like, can accurately and automatically perform carcass processing operations as the carcass continuously moves along the carcass rail.

2. Background Art

Meat processing facilities such as those that process hogs, operate on carcasses that continuously move along an overhead carcass rail. Each carcass is suspended, typically from its hind legs, from a trolley that rides along the overhead carcass rail or track. The trolleys are driven by a chain so that each carcass moves past each processing station at a speed set by the chain.

It is becoming more common for processing operations that were previously performed manually to be performed by automated equipment. For example, one step in carcass processing is to split the carcass vertically along the backbone. In many facilities, this splitting operation is now being performed with automated carcass splitters.

One such automated carcass splitting device is shown in U.S. Pat. No. 6,126,536 issued to Kielwasser on Oct. 3, 2000, which is assigned to Jarvis Products Company.

In order to properly process the carcass, it is essential for the automated equipment to accurately know the position of the carcass relative to the processing equipment. For example in a carcass splitter it is essential to know the position of the spine of the carcass so that the cut can be made along the centerline of the spine. Any deviation from that centerline by the cutting saw is extremely undesirable.

The position at the upper end of the carcass is generally more accurately known than the position of the lower end. This is because the upper end of the carcass is suspended from the trolley and the location of the trolley is determined by the chain driving the trolley along the carcass rail. However, even this position may not be perfectly known due to the distance below the rail where cutting begins and the fact that the carcass may swing forward and back. The trolley may even roll slightly ahead of the driving point by the chain. Accordingly, although the location of this upper end is known to reasonable accuracy, the location is not perfectly known.

The location of the lower end of the suspended carcass is even more uncertain. The chain may stop and start, or it may turn corners or the trolley may encounter imperfections in the carcass rail. All of these may cause the carcass to swing forward and back in a swinging motion parallel to the direction of motion of the chain. This motion causes great difficulty in automated processing operations, particularly processing operations that occur near the bottom end of the carcass away from the more accurately known reference point at the top end of the carcass.

In U.S. hog carcass processing facilities, it is common for the head of the animal to remain attached to one side of the carcass. The head acts as a heavy pendulum which can accentuate the swinging motion of the carcass as the carcass chain starts and stops.

The entry of the carcass into position before an automated processing machine is referred to as the "presentation" of the carcass to the automated equipment. It is desirable for this presentation to be accurate and consistent for each carcass so that an accurate cut or other processing operation may be completed.

Once the carcass is presented, the carcass processing equipment will typically have final positioning equipment to hold the carcass as the processing is completed. The present invention relates to improving the presentation, minimizing or eliminating swinging and assisting the processing equipment in accurate processing.

There have previously been attempts to control the position of the carcass relative to automated processing equipment. U.S. Pat. No. 6,126,536 issued to Keilwasser traps the carcass between back rollers (and/or slides) that engage the back of the carcass and smaller rollers (and/or slides) on the opposite side that engage and track the spine. Both the back rollers and spine rollers are extendable to contact the carcass and vertically movable to slide/roll down along the carcass as it is split.

The back side roller assembly engages the back of the carcass while the spine side rollers engage and track down along the spine along the inner side of the carcass. The roller assemblies on each side of the carcass act to move the carcass spine and thereby move the entire carcass slightly forward or back along the axis of the carcass rail (which is left and right relative to the splitting saw) as they move from top to bottom.

The splitting saw is located just above the roller assemblies so that the carcass spine is actively moved to the desired, accurate, position just before the saw cuts the spine and splits the carcass.

A particular advantage of the back rollers and spine roller alignment system is that the rollers initially are positioned relative to the carcass at the top of the spine, which is in the most accurately known position. The rollers then proceed from top to bottom, trapping the spine and the back of the carcass, so that the remainder of the spine and carcass move to the desired position just before the cut is made.

Although this design is effective, there remain difficulties and problems when cutting. An improved set of rollers to help with carcass alignment is shown in U.S. Pat. No. 6,468,146, also assigned to Jarvis Products Corporation.

Despite these improvements, the spine is not well defined at the top of the carcass and the spine rollers may not correctly engage it at the beginning of the cutting operation even if the carcass is correctly presented. Alternatively, the spine may not be perfectly straight and the rollers, which are attempting to track the spine, may inadvertently roll off that track producing a "miscut." If the carcass is swinging or moving significantly, it may also prevent accurate cutting.

Despite these potential issues, the back roller/spine roller system described above is a significant improvement over designs such as that seen in U.S. Pat. No. 4,653,150 issued to Leining on Mar. 31, 1987 in which the carcass is held between a pair of vertically fixed guide plates. The back roller/spine roller system described above actively realigns the spine just before cutting. The Leining design simply traps the carcass in the position it is presented to the machine. The guide plates extend out from a frame to trap the sides of the carcass. The carcass position when it is trapped sets where the spine cut is made. The guide plates often trap the carcass in a crooked orientation, particularly where the carcass is swinging as it is presented to the machine. If the carcass is presented slightly rotated about a vertical axis, or if the spine is slightly crooked, the saw cannot accommodate or correct the incorrect alignment.

It will be understood that the back rollers and inner spine rollers of the design shown in U.S. Pat. No. 6,126,536 move both vertically and horizontally. The horizontal motion is to track the carcass as the carcass continuously moves along the carcass rail. The vertical motion is to actively align the spine with the saw, which is following closely behind. This allows the splitting operation to proceed while the carcass is continuously moving along the carcass rail.

Nonetheless, if a carcass is rapidly swinging or moving as it is presented to the machine, the initial grasping of the carcass by the rollers at the top may be misaligned and the rollers will continue to be misaligned as they track the carcass. Alternatively, the spine of the animal may be shaped such that the rollers roll off the spine. The subsequent cutting and processing operations on the carcass will not occur in the correct location if the rollers are not correctly positioned relative to the spine of the carcass.

The present invention is intended to address these problems. The present invention prevents the carcass from swinging. In the preferred embodiment, it also acts to straighten the centerline of the carcass so that all parts of the carcass are in a more accurately known position. As will be described more fully below, the present invention stabilizes the carcass by grasping the carcass at a lower position to prevent swinging and then acts to pull down on the bottom end of the carcass. This has the effect of more accurately positioning the bottom end of the carcass to a known location just as the upper end is at a known location. The downward pull on the carcass then acts to straighten the spine of the animal, which provides improved performance of the tracking of the spine by the roller guide system described above.

DISCLOSURE OF THE INVENTION

Bearing in mind the problems and deficiencies of the prior art, it is therefore an object of the present invention to provide a carcass stabilizer that addresses one or more of the problems described above.

The carcass stabilizer holds a carcass and prevents swinging motion parallel to a carcass rail. The preferred embodiment includes a pair of arms that open widely to grasp a swinging carcass as the carcass moves. The carcass is grabbed at a point below the suspension point of the carcass to bring it to a known vertical position. The arms continuously move with the carcass as a carcass processing operation is performed and also preferably move down during the processing operation to exert a downward pull on the carcass and thereby straighten the carcass and more accurately hold it in an aligned position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

MODES FOR CARRYING OUT THE INVENTION

In describing the preferred embodiment of the present invention, reference will be made herein to FIGS. 1-14 of the drawings in which like numerals refer to like features of the invention.

Figure 1:
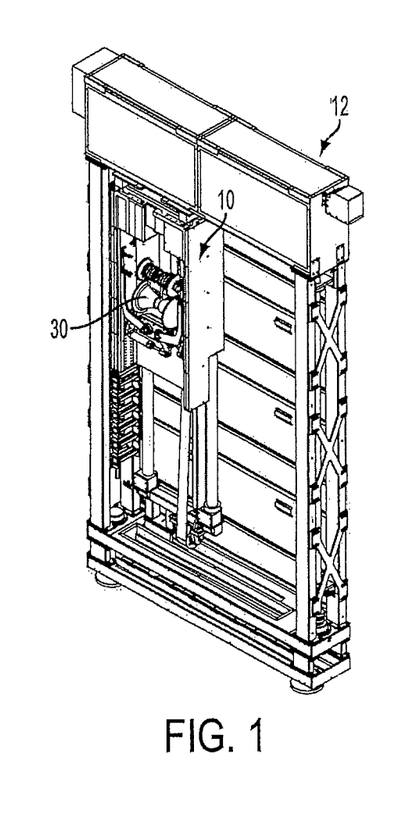
FIG. 1 is a perspective view showing a back station for a carcass splitter having a carcass stabilizer according to the present invention mounted thereon. The back station is shown in a position at the beginning of a splitting cycle in a home position with stabilizer arms retracted and the carriage near the top left of the station.
Figure 2:
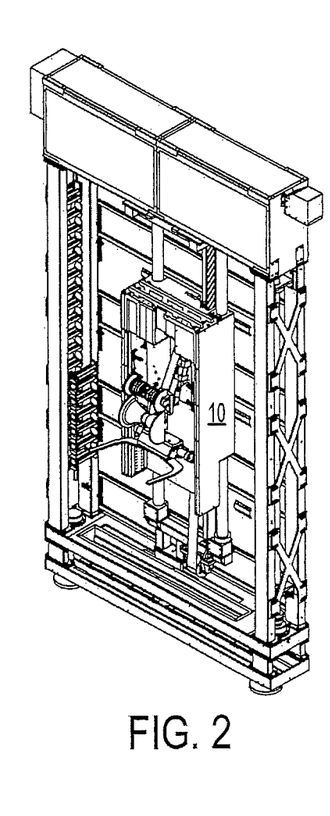
FIG. 2 is a perspective view showing the back station of FIG. 1 except that the back station is shown with the arms extended and the carriage is lower and farther to the right.
Figure 3:
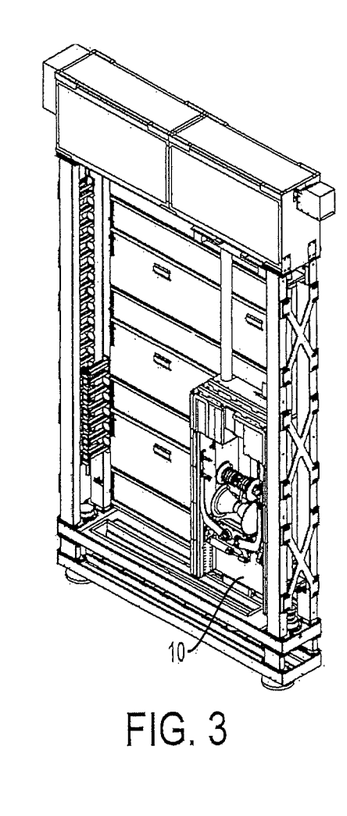
FIG. 3 is a perspective view showing the back station of FIG. 1 except that the back station is shown with the carriage all the way down and to the right.

FIGS. 1, 2, and 3 provide a perspective view of a preferred embodiment of the present invention in three operating positions. It will be understood that the invention is shown in use with a carcass splitter, but it may be used with other automatic or robotic carcass processing equipment that requires the carcass to be in a known position before the processing can be completed.

In the most highly preferred embodiment, the invention will be integrated with the carcass processing equipment, as shown, but it may be used or mounted separately before the machine or opposite or adjacent thereto. In the most highly preferred embodiment, the invention will be used in conjunction with automated carcass processing equipment that further refines the position of the carcass or detects the position of the carcass area to be processed, but it may also be used as the only device for setting the presentation and position of the carcass relative to the processing equipment.

The preferred embodiment shown in FIGS. 1, 2, and 3 has the carcass stabilizer mounted on carriage 10 that moves vertically and horizontally within a back station 12. The back station 12 is mounted on one side of the line of carcasses moving along the carcass rail so that the back carriage 10 can move parallel to the continuous flow of carcasses along the rail.

Figure 4:
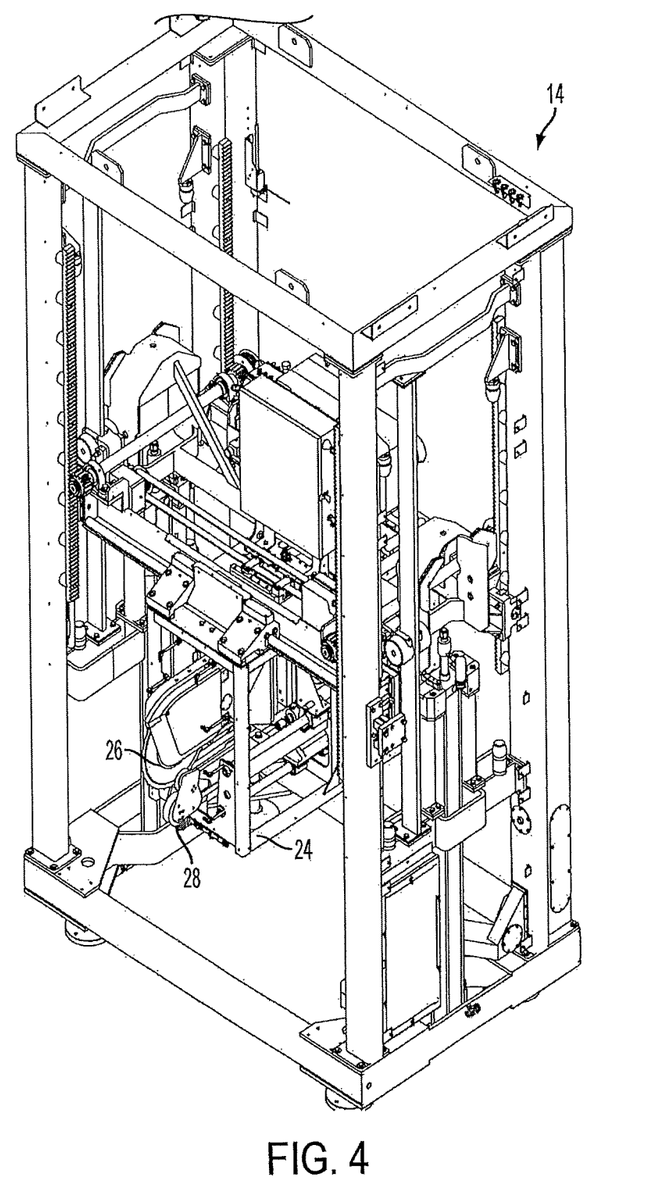
FIG. 4 is a perspective view of a front saw station for a carcass splitter used with the back station shown in FIGS. 1-3.

FIG. 4 provides a perspective view of the front station 14 of a processing machine for use in combination with the back station shown in FIGS. 1, 2, and 3. The back station and the back carriage 10 carry the back rollers and the stabilizer of the present invention. The front station, which may also be referred to as the "saw station," is mounted on the opposite side of the line of moving carcasses from the back station.

In the processing machine described herein, the processing operation is a splitting operation in which a carcass is split vertically into two halves along its spine. However, the carcass stabilizer invention may be used in connection with processing equipment other than splitting saws. The carcass stabilizer described herein is effective at reducing the swinging of the carcass and at bringing the bottom end of the carcass into a known aligned position relative to the known position at the top end of the carcass.

In the most highly preferred embodiment described herein, the stabilizer not only reduces swinging and moves the vertical line of the carcass more accurately into a known position, it also provides a downward pulling force on the carcass. This force acts to straighten the spine of the carcass to straighten the centerline and bring the carcass into a known aligned position.

FIGS. 5-8 provide a top view of the relative positions of the back station 12, the front station 14, and carcasses 16, 18, and 20 moving in direction 22 between the front station and back station. Referring to FIG. 4, it will be seen that the front station 14 also includes a carriage 24 which carries a splitting saw 26 and a set of front guide rollers 28 that are extended into the eviscerated carcass to guide along the spine as previously described.

As is described more fully in U.S. Pat. No. 6,126,536, the back rollers generally marked with reference number 30 are mounted on back carriage 10. The back rollers can be extended outward from the back carriage 10 towards the front station and into contact with the back of the carcass. The front guide rollers 28 extend outward from the front carriage 24 towards the back station and into contact with the spine.

Figure 5:
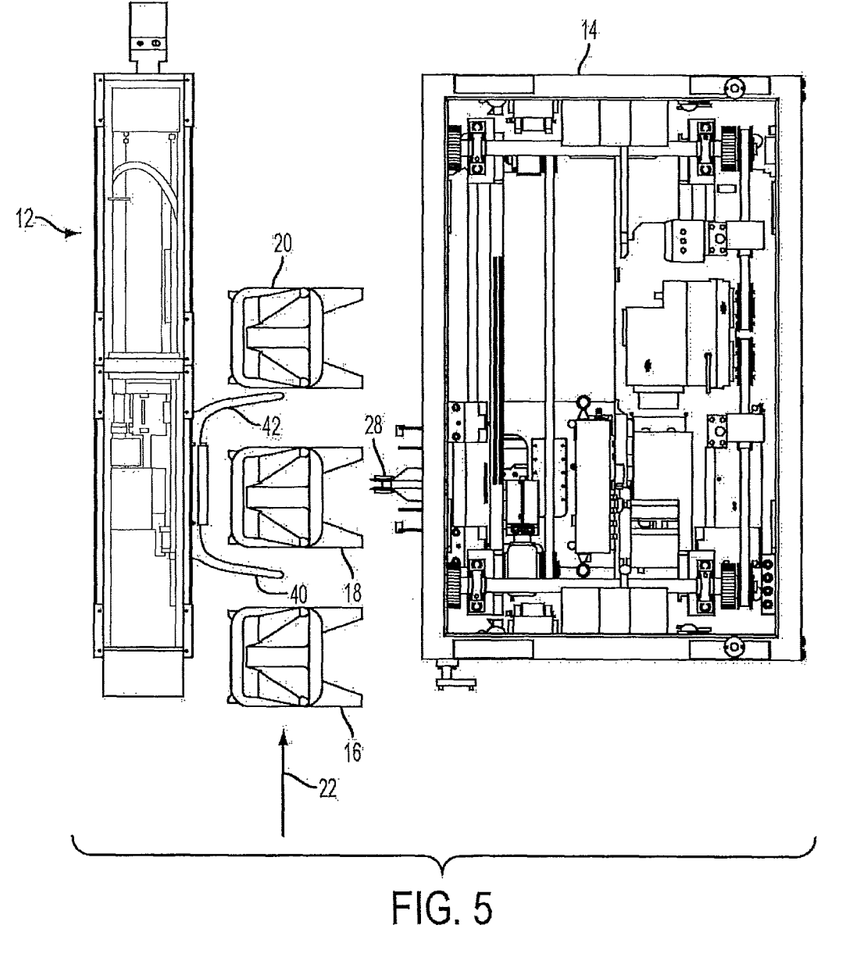
FIGS. 5-8 are top views of the front and back stations seen in FIGS. 1-4 in their positions relative to a carcass processing line showing different stages of operation of the present invention.

The opposing carriages 10 and 24 are initially located near the top of the machine and close to the point where the carcasses enter (near carcass 16 in FIG. 5). The back roller 30 on the back station 12 is extended outward from the carriage 10. The guide rollers 28 on the front carriage 24 extend outward from the front/saw station 14. This traps the spine of the carcass at a known location.

Generally, this operation will result in an accurate grasping and positioning of the carcass according to the location of the spine. However, if the carcass is swinging, particularly if it is moving forward and back along the direction of the carcass rail, and/or if the attached head of the carcass is pendulum swinging due to stopping and starting of the carcass line, the position of the carcass may not be accurate enough for a proper grasping by the rollers to occur. The present invention addresses this problem.

Figure 9:
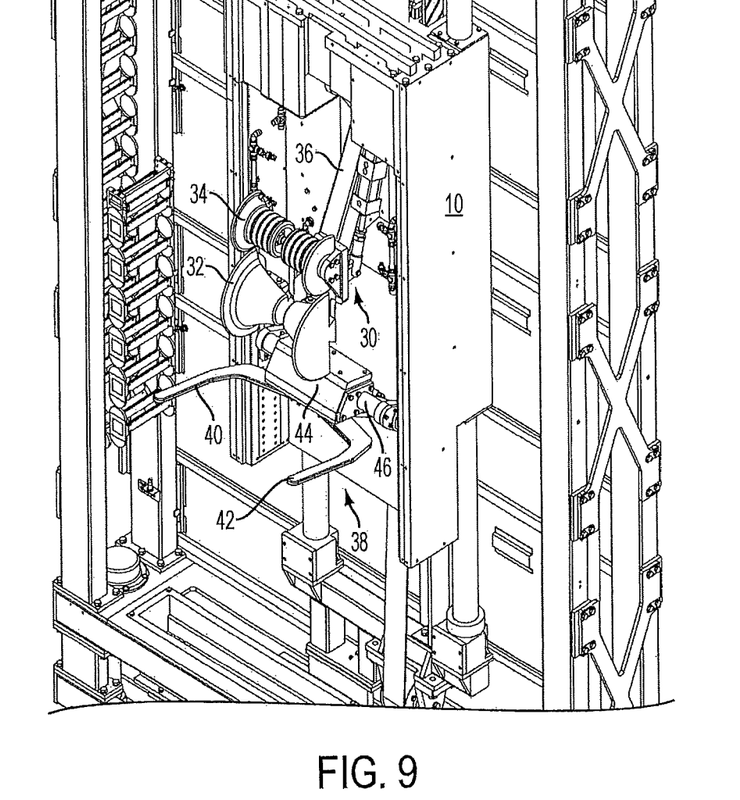
FIG. 9 is a detail view from FIG. 2 at an increased scale showing the arms extended.

FIG. 9 provides a detailed view of the back carriage 10 and the back roller assembly 30 which includes lower guide 32 and upper guides and rollers 34. These back rollers/guides are extendable outward with pivoting arm 36 to move into contact with the back of the carcass.

The present preferred embodiment for the carcass stabilizer is generally indicated with reference number 38 and includes a pair of arms 40, 42 which are geared together to swing in an open and closed—pincer-like motion. The gears 56, 58 are located within housing 44 as can be seen in exploded view of FIG. 11. The housing 44 and the arms 40, 42 pivot about shaft 46 which is fixed to the carriage 10 and is perpendicular to the axis of rotation of the gears 56, 58.

Figure 10:
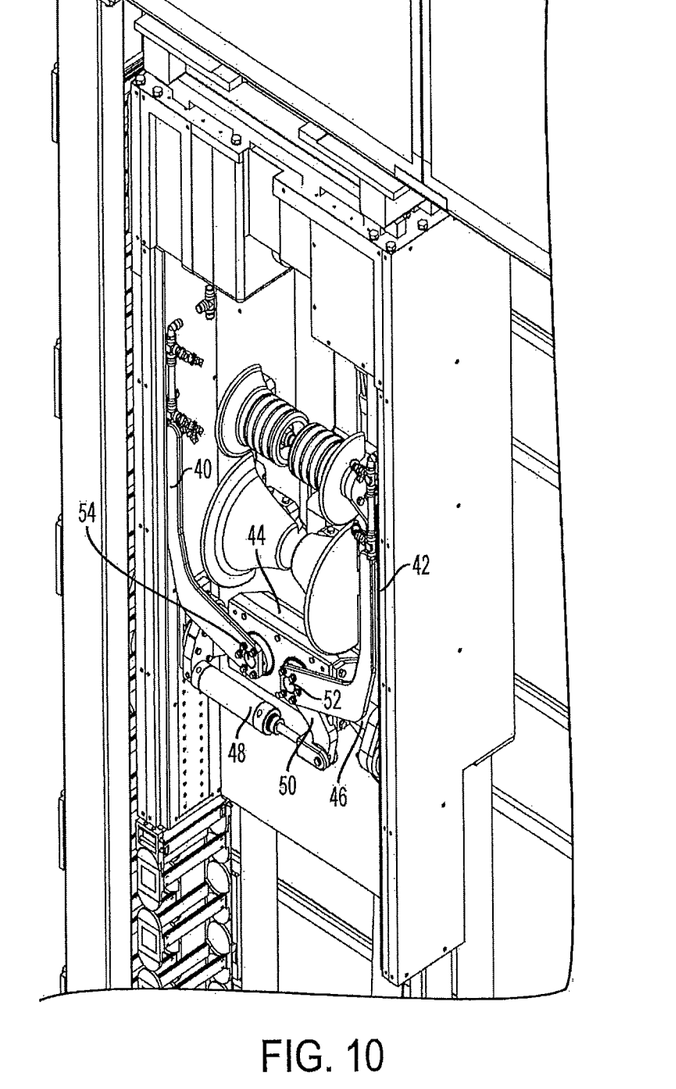
FIG. 10 is a detail view from FIG. 1 at an increased scale showing the arms retracted.
Figure 11:
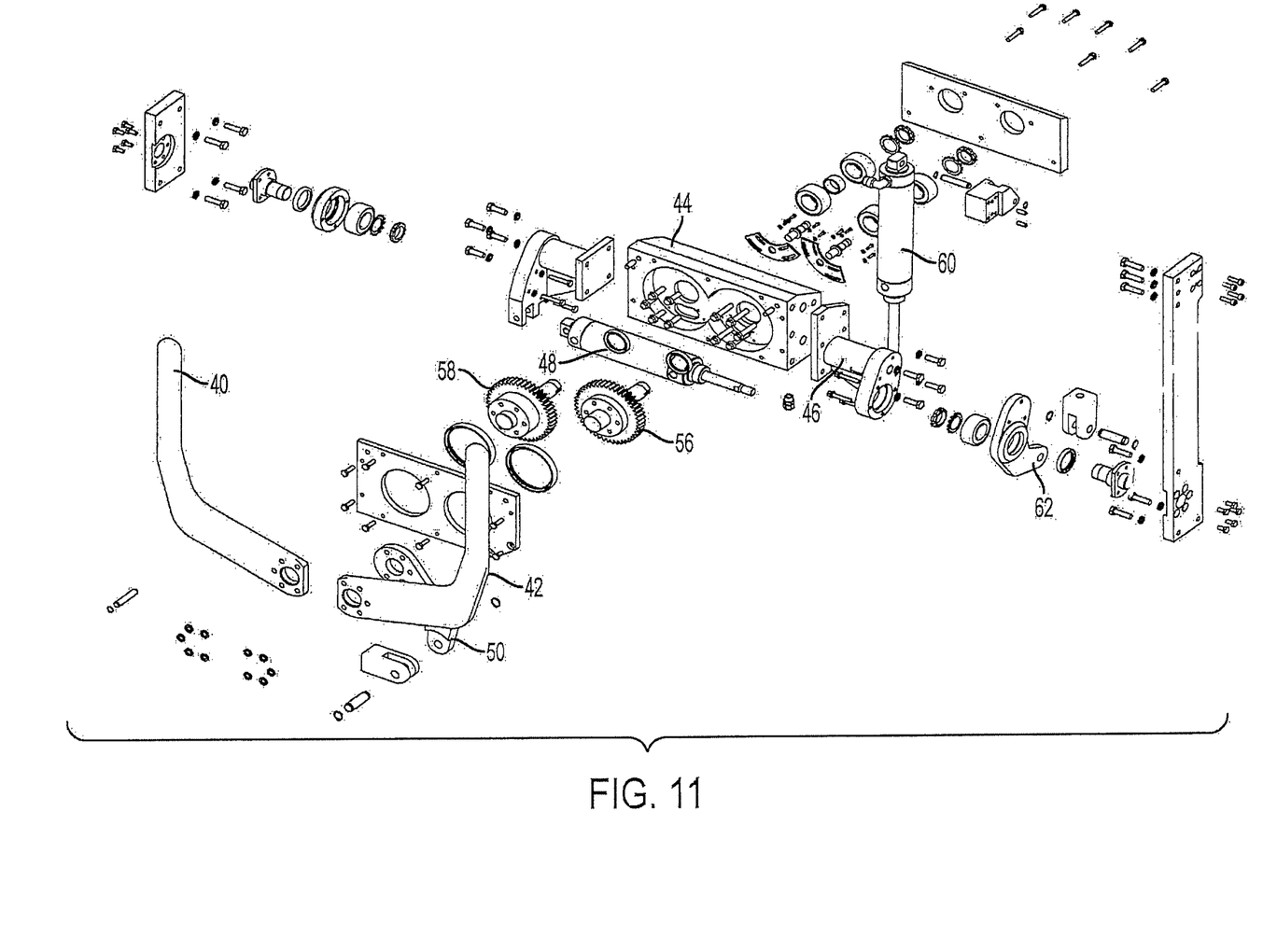
FIG. 11 is an exploded view of the carcass stabilizer of the present invention.

FIG. 9 is a detailed view of FIG. 2 at an increased scale showing the arms rotated down. FIG. 10 is a detailed view of FIG. 1 at an increased scale showing the arms rotated up. Referring to FIG. 10, the arms 40, 42 as well as the housing 44 have been pivoted about shaft 46 to the raised position (as in FIG. 1). In FIGS. 10 and 11, it can be seen that the arms 40, 42 are opened and closed by pneumatic cylinder 48 which drives pivot arm 50 attached to arm 42. Arms 40 and 42 are geared together inside housing 44 so that they move together. When cylinder 48 retracts arm 40, arm 42 swings open about shaft 52 which drives gearing inside housing 44 to also open arm 40. Arm 40 pivots about shaft 54.

The exploded view of the invention in FIG. 11 shows how gears 56 and 58 interact and are attached to arms 52 and 54 to ensure that they open and close simultaneously.

Figure 12:
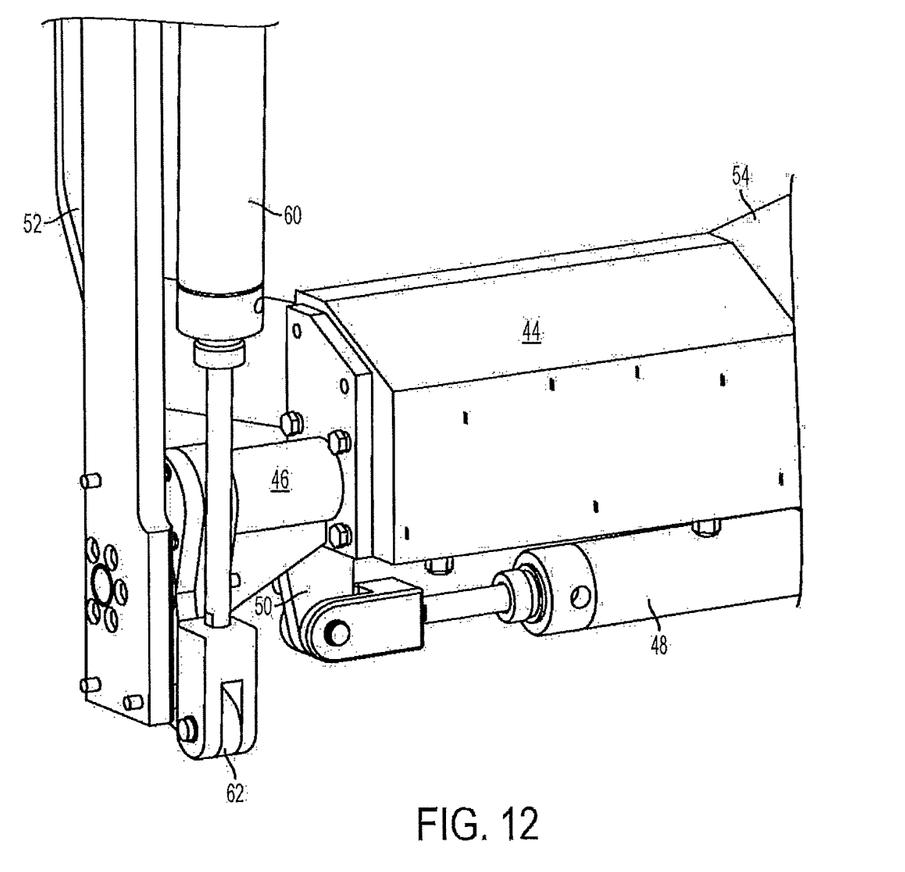
FIG. 12 is a perspective view from the back of the carcass stabilizer of the present invention to show actuators and relative positions of components when assembled.

The stabilizer housing 44 and arms 40, 42 rotate about shaft 46. They are driven by pneumatic cylinder 60 as seen in FIG. 12. FIG. 12 provides a back view of the carcass stabilizer with various components removed from the surrounding carcass splitter to show the actuators and operating linkages.

Pneumatic cylinder 60 drives the housing 44 and the arms about shaft 46 through the connection to arm 62 in the same way that the rotation of the arms 52 and 54 are driven open and closed by pneumatic cylinder 48 and arm 50.

The operation of the carcass stabilizer will now be described primarily with reference to the sequential views of FIGS. 5-8.

Referring to FIG. 5, carcass 18 has just entered the work area. Carcass 20 has just been split and carcass 16 is just outside the work area. All three carcasses are continuously moving. In a typical processing operation, carcass 18 will only be within the operating area of the machine for three seconds.

During that time, the stabilizer must stabilize the carcass, the front and back rollers must extend to find the top of the carcass, the saw and rollers must drive to the bottom end of the carcass to split the carcass, the stabilizing at ns, saw and front/back roller must all retract and all must return from the bottom position at the exit of the machine to the top position at the front of the machine ready for the next carcass.

As can be seen in FIG. 5, arms 40, 42 are driven open by cylinder 48 such that the distance between the arms corresponds to the maximum spacing between two carcasses minus the average width of a single carcass. In other words, arms 40, 42 will be open to the maximum extent permitted by the spacing between the carcasses For a common spacing in a carcass processing facility, the carcass spacing is 24 inches and the width of each carcass is approximately 18 inches. Thus, the space between the carcasses will be approximately 6 inches. With arms 40 and 42 open to the maximum permissible extent, they will include the 6 inch gap on either side of carcass 18 plus the expected 18 inch width of that carcass for a total of 30 inches.

This ensures that regardless of where carcass 18 is located within the space between carcasses 16 and 20, the arms 40, 42 will be positioned on either side of carcass 18 when the arms are pivoted down and into the position seen in FIG. 5.

The position shown in FIG. 5 has pneumatic cylinder 48 retracted to open the arms and pneumatic cylinder 60 retracted to lower the arms into position between the carcasses. It will be noted that the operation of the arms to open and close and to rotate can be achieved with electric drive motors, hydraulic or pneumatic cylinders or motors, etc.

Figure 6:
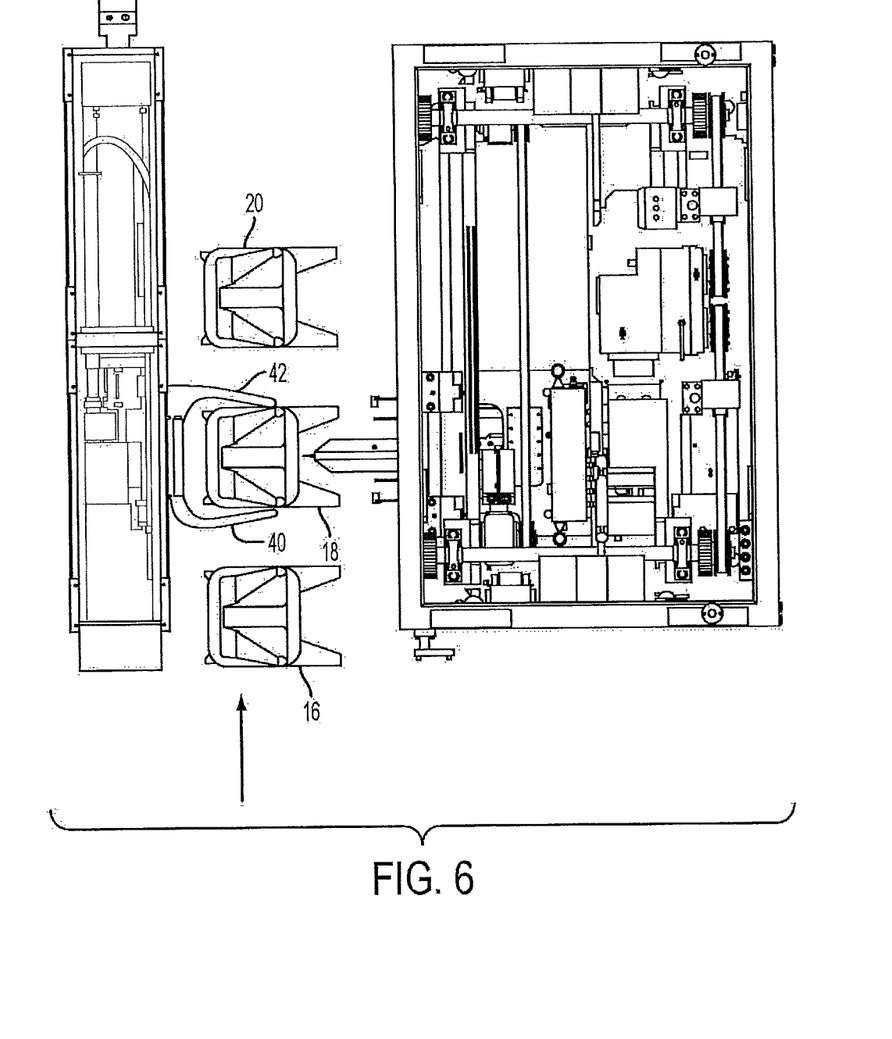

The next step is shown in FIG. 6. The pneumatic cylinder 48 has been extended to close the arms 40, 42 and grasp the carcass 18. By comparison between FIGS. 5 and 6 it can be seen that in FIG. 5, the front roller assembly 28 has not yet been extended, whereas in FIG. 6 the back roller assembly 30 and the front roller assembly 28 have both been extended to grasp the spine of the carcass.

The closure of arms 40, 42 in FIG. 6 ensures that the carcass is no longer swinging. The arms are positioned at a point relatively lower on the carcass than the position of the rollers and well below the known point of the trolley on the trolley wheel at the upper end of the carcass. Thus the carcass has been moved into an accurate centerline position by the closure of the arms.

All swinging motion, particularly motion forward and back in the direction of travel of the carcass has been eliminated. The spine side rollers 28, which follow the spine, can more accurately locate the spine after the arms 40, 42 have closed to improve carcass presentation. The spine side rollers 28 are above the point where the arms 40, 42 of the stabilizer have grasped the carcass. The carcass is held both at the top by the trolley and at the bottom by the arms. The arms ensure that the spine and back rollers accurately find the spine. The stabilizer preferably works with the final carcass locating system (back rollers/spine side rollers) of the carcass processing equipment, although the stabilizer may perform all of the locating and positioning function.

As the saw begins its cut, the back rollers and the entire back carriage 10 with arms 40, 42 move down, towards the floor of the processing facility. This can be seen by comparing FIGS. 1 and 2.

Arms 40, 42, which have grasped the carcass, exert a slight downward pull on the carcass. This pull is just sufficient to straighten the spine but not sufficient to actually pull the carcass from its attachment point on the trolley rail. This combination of arm closing and downward pull is a preferred additional feature of the invention which includes the method of straightening the carcass as the cutting operation is performed. The cutting may be a saw splitting operation as disclosed or robot may be used for various other types of carcass processing operations in which the carcass is stabilized first to prevent swinging and then straightened with a downward pull.

The downward pull may be applied before any cutting operation is performed or may be performed approximately simultaneously as the cutting is achieved, particularly where the cutting, as in the present description, occurs at the point above the stabilizing arms.

Figure 7:
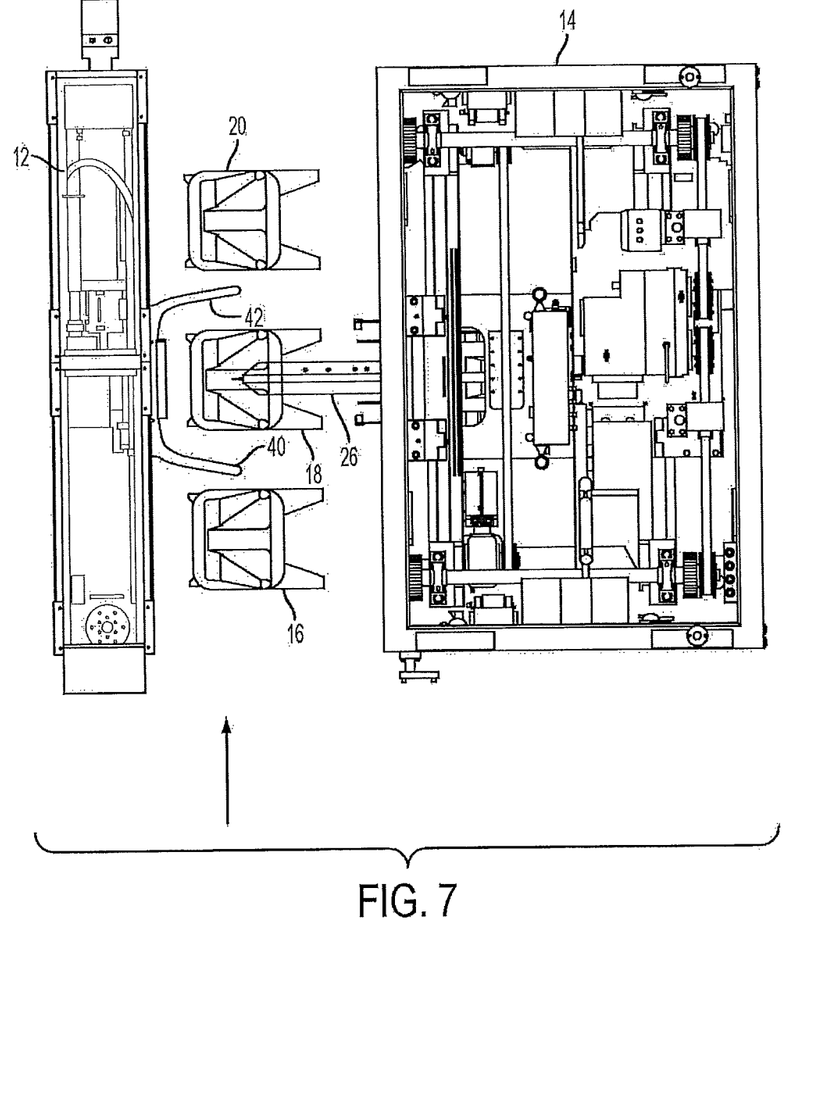

Referring to FIG. 7, the arms 40, 42 have been opened by retracting the pneumatic cylinder 48.

As previously described, the carcasses are continuously moving along the carcass rail and the cutting operation and stabilizing operation of the present invention are all performed as the carcasses continuously move.

Figure 8:
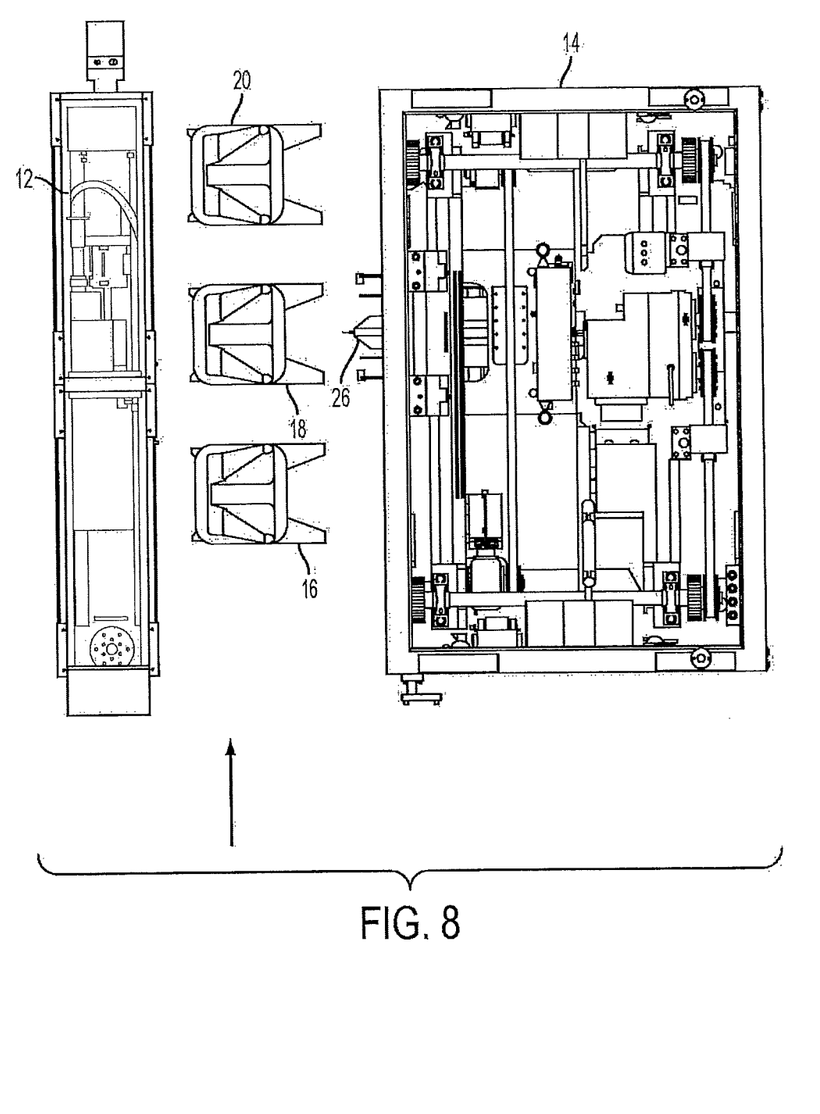

Once the arms 40, 42 have been opened as in FIG. 7, pneumatic cylinder 60 is extended to pivot the arms. This pivoting action raises the arms. Referring to FIG. 8, the arms have been fully raised to the vertical position and simultaneously closed slightly to fit into the limits of carriage 10 as seen in FIG. 10. However, the arms may also be left fully or slightly open according to the view shown in FIG. 7 as they are rotated up.

Even with the arms open, they extend only slightly from the back station 12 when rotated up. As can be seen in FIG. 8, there is sufficient room between the back of the carcasses and the back station 12 to allow the arms to move towards the next carcass 16 to be processed.

As can be seen in FIG. 7, the saw 26 is fully extended to split the carcass and as can be seen in FIG. 8, the saw 26 has been fully retracted and carcass 18 has been split. Following the retraction of the saw 26 into the front station 14 and the retraction of the back rollers into the back station 12, the back and front carriages 10 and 24 will drive into position to engage carcass 16 and the operation will be repeated.

Referring to FIGS. 1-3, FIG. 1 approximately corresponds to the position of the saw after FIG. 8 in which the back carriage has been drawn to the starting position at the top left of back station 12 with the arms 40, 42 closed and pivoted upwards to the retracted position. FIG. 2 approximately corresponds to the position during and just after FIG. 6 in which the back carriage 10 has moved slightly down and to the right—following the moving carcass. The arms are then engaging the carcass and exerting a slight downward force on the carcass to align and position the lower end of the carcass. The downward pull between the known position of the arms and the known position of the carcass trolley on the carcass rail produces the straightened centerline for the carcass at a known position.

FIG. 3 approximately corresponds to the position just after FIG. 8 when the cutting operation has been complete and the stabilizer arms have been retracted, but before the back station 10 has returned to its starting position of FIG. 1.

From the above description it will be understood that the stabilizer is preferably operated so that it does not add to the cycle time of the processing equipment. It takes advantage of the space between carcasses to open and close around the carcass regardless of its position. In the most highly preferred design, it is carried with another portion of the processing equipment, such as the back carriage.

The most highly preferred operation of this invention includes holding the carcass while the cutting operation is performed, holding the bottom end of the carcass while the top end is fixed, exerting a slight downward pulling/sliding motion of the arms along the carcass to straighten the spine with a downwardly exerted force from a point well below the hanging top end of the carcass. This is preferably coupled with an additional alignment for the cutting operation such as alignment with the back rollers and inner rollers along the spine of the carcass to further establish a known fixed location for the carcass during the cutting operation.

Figure 13:
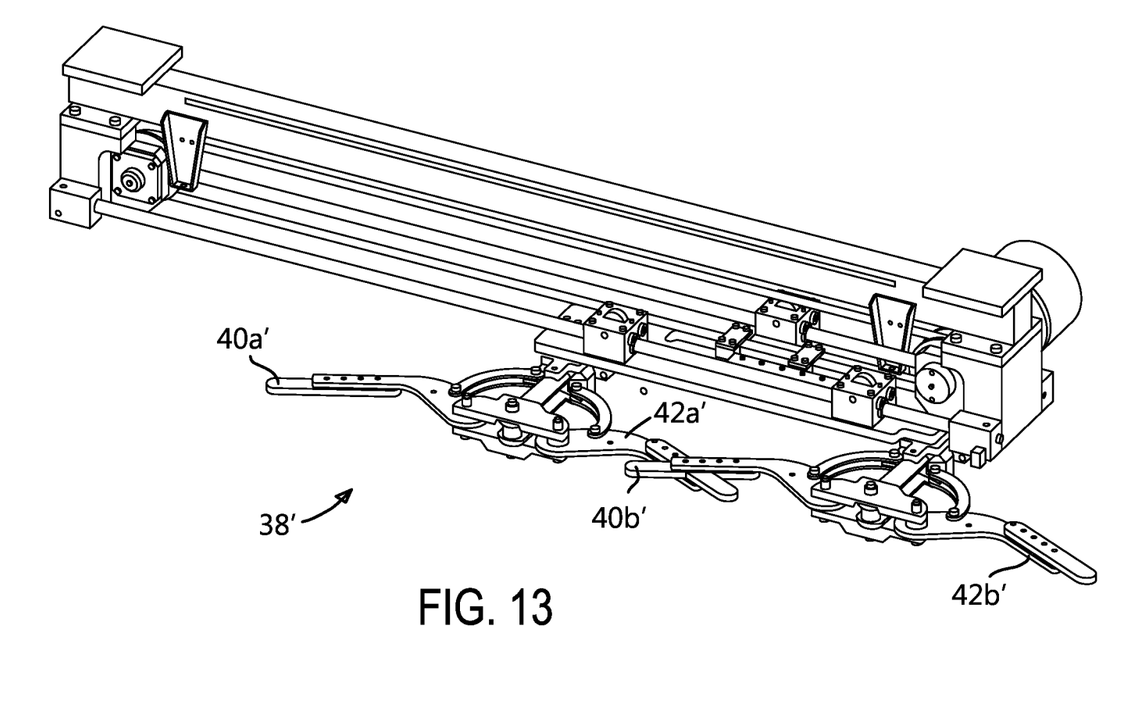
FIG. 13 shows a second embodiment of the present invention.
Figure 14:
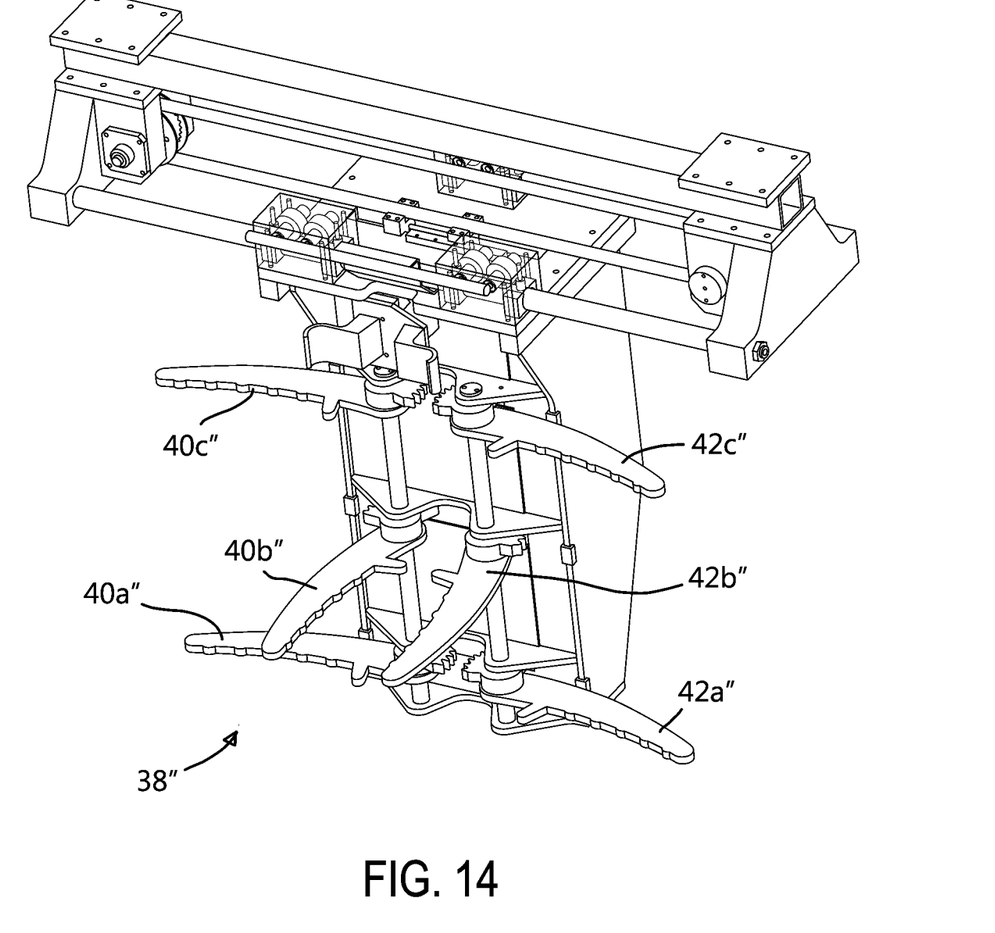
FIG. 14 shows a third embodiment of the present invention.

However, the present invention can also be operated simply to remove the initial swinging of the carcass prior to entry of the carcass into a conventional automated cutting machine. This improves presentation of the carcass to the cutting equipment by eliminating all swinging and other extraneous motion which can interfere with that cutting operation. FIG. 13 shows an alternative embodiment in which the stabilizer is provided as a separate stabilizer 38' mounted just prior to entry of the machine. In this embodiment two sets of arms 40a', 42a' and 40b', 42b' are used to simultaneously capture two carcasses. The carcasses may be held during the cutting operation or released after the carcasses arrives, but before the cutting operation actually proceeds. In the embodiment shown in FIG. 13, no vertical motion is provided.

Yet another embodiment is shown in FIG. 14 in which, again, a stand alone carcass stabilizer 38" is provided. In this embodiment, there are multiple sets of arms 40a", 42a", 40b", 42b" and 40c", 42c", each of which may be independently opened or closed to stabilize the carcass at different points in time and at different locations along the carcass. The arms may all be closed and opened together or each arm may be opened and closed at a separate time. Alternatively, the entire assembly may be mounted to move vertically, if desired, to add the feature of pulling on the carcass to straighten the spine.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A carcass stabilizer for stabilizing a carcass as it is continuously moved along a carcass rail, the carcass stabilizer comprising:
   at least two arms mounted for motion parallel to the carcass rail;
   an open/close driver connected to the at least two arms to drive the arms between open and closed positions, the arms opening to accept the carcass therebetween when in the open position and the arms closing to contact the carcass on opposed sides of the carcass when in the closed position;
   a horizontal driver, the horizontal driver moving the arms substantially parallel to the carcass rail to track the motion of the carcass as the carcass is continuously moved along the carcass rail; and
   a pivoting driver, the pivoting driver pivoting the at least two arms about an axis substantially parallel to the carcass rail between an operating position and a retracted position,
   the open/close driver closing the at least two arms in the operating position around the carcass at a point below an upper end of the carcass to stabilize the carcass and prevent the carcass from swinging in a direction parallel to the carcass rail.

2. The carcass stabilizer for stabilizing a carcass according to claim 1 wherein the pivoting driver is a pneumatic cylinder.

3. The carcass stabilizer for stabilizing a carcass according to claim 1 wherein:
   the at least two arms are driven by the pivoting driver to the operating position when the arms are in the open position to position the arms on opposed sides of the carcass; and
   the at least two arms are thereafter driven by the open/close driver to the closed position to stabilize the carcass by contacting the carcass with the at least two arms on opposed sides of the carcass.

4. The carcass stabilizer for stabilizing a carcass according to claim 3 wherein:
   the at least two arms are driven by the open/close driver to the open position after a carcass processing operation has been performed on the stabilized carcass; and
   the at least two arms are thereafter driven by the pivoting driver to the retracted position.

5. The carcass stabilizer for stabilizing a carcass according to claim 1 wherein the carcass stabilizer is mounted on a carcass splitter.

6. The carcass stabilizer for stabilizing a carcass according to claim 1 wherein the open/close driver is a pneumatic cylinder.

7. The carcass stabilizer for stabilizing a carcass according to claim 1 wherein the open/close driver drives at least two arms to an open position no greater than approximately twice a spacing distance between carcasses on the carcass rail minus an approximate width of a carcass to be processed such that the at least two arms can be positioned on either side of the carcass to be processed and the arms fit into gaps between the carcass to be processed and carcasses located on either side of the carcass to be processed.

8. The carcass stabilizer for stabilizing a carcass according to claim 1 wherein the open/close driver drives the at least two arms to an open position of approximately 30 inches (76.2 cm).

9. A carcass stabilizer for stabilizing a carcass as it is continuously moved along a carcass rail, the carcass stabilizer comprising:
   at least two arms mounted for motion parallel to the carcass rail;
   an open/close driver connected to the at least two arms to drive the arms between open and closed positions, the arms opening to accept the carcass therebetween when in the open position and the arms closing to contact the carcass on opposed sides of the carcass when in the closed position;
   a horizontal driver, the horizontal driver moving the arms substantially parallel to the carcass rail to track the motion of the carcass as the carcass is continuously moved along the carcass rail; and
   a vertical driver for driving the at least two arms vertically, the open/close driver closing the at least two arms around the carcass at a point below an upper end of the carcass to stabilize the carcass and prevent the carcass from swinging in a direction parallel to the carcass rail.

10. The carcass stabilizer for stabilizing a carcass according to claim 9 wherein the at least two arms are driven vertically down by the vertical driver while the at least two arms are in the closed position to exert a downward pull on the carcass.

11. The carcass stabilizer for stabilizing a carcass according to claim 9 wherein the open/close driver drives at least two arms to an open position no greater than approximately twice a spacing distance between carcasses on the carcass rail minus an approximate width of a carcass to be processed such that the at least two arms can be positioned on either side of the carcass to be processed and the arms fit into gaps between the carcass to be processed and carcasses located on either side of the carcass to be processed.

12. A carcass stabilizer for stabilizing a carcass as it is continuously moved along a carcass rail, the carcass stabilizer comprising:
   at least two arms mounted for motion parallel to the carcass rail;
   an open/close driver connected to the at least two arms to drive the arms between open and closed positions, the arms opening to accept the carcass therebetween when in the open position and the arms closing to contact the carcass on opposed sides of the carcass when in the closed position; and
   a horizontal driver, the horizontal driver moving the arms substantially parallel to the carcass rail to track the motion of the carcass as the carcass is continuously moved along the carcass rail;
   the open/close driver closing the at least two arms around the carcass at a point below an upper end of the carcass to stabilize the carcass and prevent the carcass from swinging in a direction parallel to the carcass rail, and
   the carcass stabilizer is mounted on a carcass splitter having a carcass splitting saw on a first side of the carcass splitter and the carcass stabilizer is mounted on a second side of the carcass splitter opposite the first side.

13. The carcass stabilizer for stabilizing a carcass according to claim 12 wherein the open/close driver drives at least two arms to an open position no greater than approximately twice a spacing distance between carcasses on the carcass rail minus an approximate width of a carcass to be processed such that the at least two arms can be positioned on either side of the carcass to be processed and the arms fit into gaps between the carcass to be processed and carcasses located on either side of the carcass to be processed.

14. A carcass stabilizer for stabilizing a carcass as it is continuously moved along a carcass rail, the carcass stabilizer comprising:

at least two arms mounted for motion parallel to the carcass rail;

an open/close driver connected to the at least two arms to drive the arms between open and closed positions, the arms opening to accept the carcass therebetween when in the open position and the arms closing to contact the carcass on opposed sides of the carcass when in the closed position;

a horizontal driver, the horizontal driver moving the arms substantially parallel to the carcass rail to track the motion of the carcass as the carcass is continuously moved along the carcass rail; and the open/close driver closing the at least two arms around the carcass at a point below an upper end of the carcass to stabilize the carcass and prevent the carcass from swinging in a direction parallel to the carcass rail, and the carcass stabilizer is integrated into a carcass splitter and the horizontal driver of the carcass stabilizer horizontally drives back rollers of the carcass splitter.

15. The carcass stabilizer for stabilizing a carcass according to claim 14 wherein the carcass splitter includes a vertical driver and the vertical driver of the carcass splitter vertically drives the back rollers of the carcass splitter and the at least two arms of the carcass splitter.

16. The carcass stabilizer for stabilizing a carcass according to claim 14 wherein the open/close driver drives at least two arms to an open position no greater than approximately twice a spacing distance between carcasses on the carcass rail minus an approximate width of a carcass to be processed such that the at least two arms can be positioned on either side of the carcass to be processed and the arms fit into gaps between the carcass to be processed and carcasses located on either side of the carcass to be processed.

17. A carcass stabilizer for stabilizing a carcass as it is continuously moved along a carcass rail, the carcass stabilizer comprising:

at least two arms mounted for motion parallel to the carcass rail;

an open/close driver connected to the at least two arms to drive the arms between open and closed positions, the arms opening to accept the carcass therebetween when in the open position and the arms closing to contact the carcass on opposed sides of the carcass when in the closed position;

a horizontal driver, the horizontal driver moving the arms substantially parallel to the carcass rail to track the motion of the carcass as the carcass is continuously moved along the carcass rail; and the open/close driver closing the at least two arms around the carcass at a point below an upper end of the carcass to stabilize the carcass and prevent the carcass from swinging in a direction parallel to the carcass rail, and the at least two arms are geared together with a geared connection and wherein a first one of the at least two arms is driven by the open/close driver while a second one of the at least two arms is driven by the geared connection to the first one of the arms.

18. The carcass stabilizer for stabilizing a carcass according to claim 17 wherein the open/close driver drives at least two arms to an open position no greater than approximately twice a spacing distance between carcasses on the carcass rail minus an approximate width of a carcass to be processed such that the at least two arms can be positioned on either side of the carcass to be processed and the arms fit into gaps between the carcass to be processed and carcasses located on either side of the carcass to be processed.

19. A carcass stabilizer for stabilizing a carcass as it is continuously moved along a carcass rail, the carcass stabilizer comprising:

at least two arms mounted for motion parallel to the carcass rail;

an open/close driver connected to the at least two arms to drive the arms between open and closed positions, the arms opening to accept the carcass therebetween when in the open position and the arms closing to contact the carcass on opposed sides of the carcass when in the closed position;

a pivoting driver, the pivoting driver pivoting the at least two arms about an axis substantially parallel to the carcass rail between an operating position and a retracted position;

the open/close driver closing the at least two arms around the carcass at a point below an upper end of the carcass to stabilize the carcass and prevent the carcass from swinging in a direction parallel to the carcass rail; and the carcass stabilizer being mounted on a carcass splitter having a horizontal driver and a vertical driver, the horizontal driver moving the arms substantially parallel to the carcass rail to track the motion of the carcass as the carcass is continuously moved along the carcass rail and the vertical driver driving the at least two arms vertically down while the at least two arms are in the closed position to exert a downward pull on the carcass.

20. The carcass stabilizer for stabilizing a carcass according to claim 19 wherein:

the at least two arms are driven by the pivoting driver to the operating position when the arms are in the open position to position the arms on opposed sides of the carcass; and the at least two arms are thereafter driven by the open/close driver to the closed position to stabilize the carcass by contacting the carcass with the at least two arms on opposed sides of the carcass.

21. The carcass stabilizer for stabilizing a carcass according to claim 20 wherein:

the at least two arms are driven by the open/close driver to the open position after the carcass has been at least partially split by the carcass splitter; and the at least two arms are thereafter driven by the pivoting driver to the retracted position.

22. A method of stabilizing a carcass moving along a carcass rail for a carcass processing operation comprising the steps of:

providing a pair of arms in a starting position with the arms in a retracted position providing clearance from the carcass;

moving the arms into an operating position on opposed sides of the carcass;

closing the arms into contact with the opposed sides of the carcass;

continuously moving the arms horizontally to correspond to the motion of the carcass along the carcass rail;

moving the arms down while the arms are in the closed position in contact with the carcass to exert a downward pull on the carcass;

opening the arms to release the carcass;

returning the arms to the retracted position to provide clearance for another carcass to be processed; and moving the arms horizontally to return to the starting position.

23. The method of claim 22 wherein the arms are mounted on a carcass splitter.

\* \* \* \* \*